US 11,440,386 B2

(12) United States Patent
Fowler et al.

(10) Patent No.: US 11,440,386 B2
(45) Date of Patent: Sep. 13, 2022

(54) DRIVE CHAIN ELEMENT (71) Applicant: Oakmoore Pty Ltd, Salisbury (AU)

(72) Inventors: Shane Fowler, Salisbury (AU); Wolfgang Schollhammer, Salisbury (AU)

(73) Assignee: Oakmoore Pty Ltd., Salisbury (AU)

(*) Notice: Subject to any disclaimer, the term of this patent is extended or adjusted under 35 U.S.C. 154(b) by 0 days.

(21) Appl. No.: 17/058,307

(22) PCT Filed: May 22, 2019

(86) PCT No.: PCT/AU2019/050496
§ 371 (c)(1),
(2) Date: Nov. 24, 2020

(87) PCT Pub. No.: WO2019/227134
PCT Pub. Date: Dec. 5, 2019

(65) Prior Publication Data
US 2021/0213813 A1    Jul. 15, 2021

(30) Foreign Application Priority Data

May 31, 2018    (AU) .................................. 2018901950

(51) Int. Cl.
*B60J 7/16*    (2006.01)
*B60J 7/14*    (2006.01)
*B60J 7/08*    (2006.01)

(52) U.S. Cl.
CPC ............. *B60J 7/1607* (2013.01); *B60J 7/085* (2013.01); *B60J 7/141* (2013.01)

(58) Field of Classification Search
USPC ..................... 296/98, 100.01, 100.02, 100.06
See application file for complete search history.

(56) References Cited

U.S. PATENT DOCUMENTS 5,040,843 A * 8/1991 Russell ..................... E06B 9/58
296/98
5,330,246 A * 7/1994 Bernardo ................. B60J 7/068
160/130

(Continued)

FOREIGN PATENT DOCUMENTS

CN    111251848 A * 6/2020    ............. B60J 7/067
FR    2847299 A1    5/2004

(Continued)

OTHER PUBLICATIONS

International Search Report and Written Opinion for PCT/AU2019/050496 dated Jul. 2, 2019 (9 pages).

*Primary Examiner* — Jason S Daniels
(74) *Attorney, Agent, or Firm* — Oakmoore Pty Ltd (57) ABSTRACT A drive chain element for operably connecting a slat of a roll top cover to a drive rail enables more efficient roll top cover operation. The drive chain element includes: an elongate body that defines a longitudinal axis and first and second ends, an inner side of the elongate body configured for engaging an end portion of the slat; first and second hinge elements disposed at the respective first and second ends of the body, the first and second hinge elements configured to define a hinge arrangement between adjacent drive chain elements that facilitates relative pivotal movement therebetween; and first and second pins disposed in a spaced arrangement along an outer side of the body and extending outwardly therefrom; wherein the first and second pins are configured for operably contacting a drive system during operation of the roll top cover.

19 Claims, 5 Drawing Sheets

(56) References Cited

U.S. PATENT DOCUMENTS

| | | | |
|---|---|---|---|
| 5,722,476 | A | 3/1998 | Luhan-Sanchez et al. |
| 2018/0258689 | A1 | 9/2018 | Rejc |

FOREIGN PATENT DOCUMENTS

| | | |
|---|---|---|
| GB | 2522367 B | 2/2017 |
| JP | S5038648 U | 4/1975 |
| WO | 2007/017214 A1 | 2/2007 |
| WO | 2018/001923 A1 | 1/2018 |

* cited by examiner

DRIVE CHAIN ELEMENT

CROSS-REFERENCE TO RELATED APPLICATIONS

This application is a national stage of, and claims priority to, Patent Cooperation Treaty Application No. PCT/AU2019/050496, filed on May 22, 2019, which application claims priority to Australian Patent Application No. AU2018901950, filed on May 31, 2018, which applications are hereby incorporated herein by reference in their entireties.

BACKGROUND

Numerous types of truck bed covers can be arranged over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly and drive assembly.

Prior art roll top covers can suffer from a number of drawbacks. By way of example, such roll top covers may not be fully weather resistant and/or impervious to moisture and dust. Additionally, the frictional forces that are produced between the slat assembly and the associated side rail during operation (i.e., opening and/or closing) of the roll top cover can be significant so as to make closing and/or opening difficult for a user. Further to this, movement or vibration of the slats of the roll top cover can result in the production of undesirable noise during operation of the associated vehicle.

Accordingly, an improved roll cover that overcomes one or more of the above disadvantages is required.

BRIEF DESCRIPTION OF THE DRAWINGS

To assist in understanding the disclosure and to enable a person skilled in the art to put the disclosure into practical effect, the disclosure will be described by way of example only with reference to the accompanying drawings, in which.

DETAILED DESCRIPTION

The present disclosure includes a drive chain element for operably connecting a slat or slat assembly of a roll top cover to a cargo bed of a vehicle, such as pickup trucks and utility vehicles, to a drive rail thereof. Elements of the description are illustrated in concise outline form in the drawings, showing only those specific details that are necessary to understand the disclosure, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system.

In one aspect, although not necessarily the only aspect or the broadest aspect, the disclosure includes a drive chain element for operably connecting a slat of a roll top cover to a drive rail comprising:

an elongate body that defines a longitudinal axis and first and second ends, an inner side of the elongate body configured for engaging an end portion of the slat;

first and second hinge elements disposed at the respective first and second ends of the body, the first and second hinge elements configured to define a hinge arrangement between adjacent drive chain elements that facilitates relative pivotal movement therebetween;

first and second pins disposed in a spaced arrangement along an outer side of the body and extending outwardly therefrom;

wherein the first and second pins are configured for operably contacting a drive system during operation of the roll top cover.

The first and second hinge elements may be integral with the body.

The first pin may be curved or rounded rectangular in cross section.

The second pin may be cylindrical in shape.

A lower surface of the body may include first and second curved projections in a spaced arrangement therealong and extending outwardly therefrom, the first and second curved projections for slidably supporting the drive chain element within the drive rail. The lower surface may include a substantially flattened portion disposed between the first and second curved projections.

One of the first and second hinge elements may include a male mating element and one of the first and second hinge elements may include a female mating element for operably receiving the male mating element.

The hinge arrangement between adjacent drive chain elements may define a pivot point that substantially overlies a further pivot point defined by respective adjacent slats.

The disclosure includes a drive chain assembly for operably connecting a slat assembly of a roll top cover to a drive rail, the drive chain assembly may include a plurality of operably connected drive chain elements of the aforementioned aspect.

The disclosure includes a slat assembly for a roll top cover that includes the drive chain assembly.

The disclosure includes a roll top cover assembly for operably covering the cargo bed of a vehicle. The roll top cover assembly may include the drive chain assembly or the slat assembly.

Particular advantages of the drive chain element described herein include providing an improved drive chain arrangement when engaged theretogether that significantly reduces any movement, for example, between the hinge portions of adjacent slats as well as side to side movement of the slats so as to reduce any vibration and resultant noise produced thereby. A further advantage resides in the provision of a drive chain element that contributes to the weather resistance and/or imperviousness of the roll cover to the ingress of fluids, dust and the like therethrough and into the associated cargo bed of a vehicle. A further advantage resides in the provision of reduced frictional forces that are produced between the drive chain and associated drive chain track during operation of the roll top cover so as to allow for easier and smoother opening and/or closing thereof.

Figure 1:
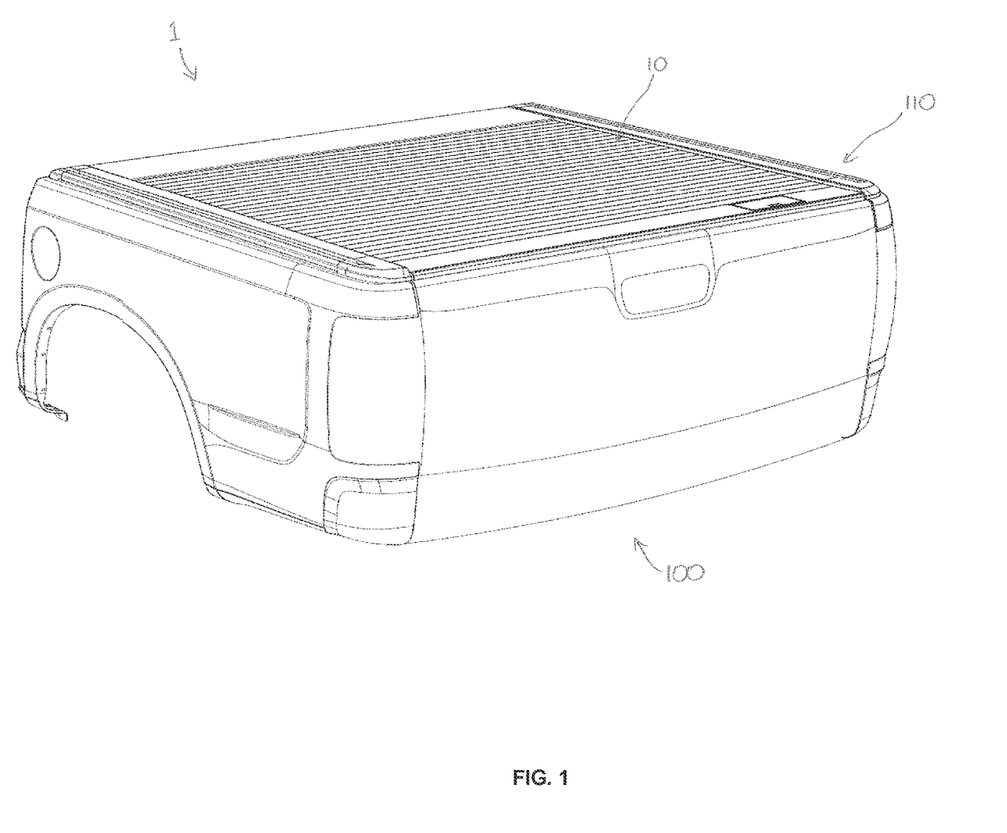
FIG. 1 is a top-down perspective view of a roll top cover suitably installed on a vehicle.

FIGS. 1 to 9 provide an example drive chain 300. As illustrated in FIG. 1, the drive chain 300 is configured for being a part of a roll top cover 1 for covering a cargo bed 110 of a vehicle 100. In the example provided, the drive chain 300 is configured for operably connecting an associated slat assembly 10 to a drive chain track 401 of a side rail 400 so as to allow for movement of the slat assembly 10 between an open or retracted position and a closed or extended position, as illustrated by FIG. 1. The slat assembly 10 is constructed of a plurality of successive and interconnected slats 11.

As can be observed in FIGS. 2 and 6 to 8, the drive chain 300 is constructed of a plurality of successive and interconnected drive chain elements 301. The drive chain elements 301 may be made or constructed from any suitable material known in the art, including, but not limited to, metals such as aluminium (e.g., marine grade aluminium) and steel, and polymeric materials, such as plastics (e.g., reinforced plastics). To this end, the drive chain elements 301 are preferably of dimensions so as to be appropriately strong as well as light weight for the drive chain 300.

Referring to FIGS. 3 to 9, each of the drive chain elements 301 has an elongate body 305 that defines a first end 320 and a second end 330 that define a length 315 of the drive chain element 301 therebetween and further define a longitudinal axis a. The drive chain element 301 further includes opposing inner and outer sides 340,350 and opposing top and bottom surfaces 360,370. As shown in FIGS. 3 to 9, the top surface 360 is substantially flattened or planar, whilst the bottom surface 370 has first and second curved or arcuate projections 371,372 disposed in a spaced arrangement at respective first and second ends 320,330 of the drive chain element 301 and extending outwardly or radially therefrom. By virtue of this arrangement, the first and second arcuate projections 371,372 are configured to minimise the contact surface area, and hence frictional forces, of the bottom surface 370 of each of the drive chain elements 301 when slidably contacting a respective guide or contact element 403 of the corresponding drive chain track 401 upon operation of the roll top cover 1. The arcuate projections 371,372 further advantageously function to maintain the associated slat assembly 10 as a substantially parallel arrangement of slats 11, which are centrally positioned with respect to the cargo bed 110 of the vehicle 100.

Further to the above and disposed between the first and second arcuate projections 371,372 is a substantially flattened portion 373 of the bottom surface 370. In this manner, a profile of the bottom surface 370, defined by the arcuate projections 371,372 and the flattened portion 373 thereof, has been configured or adapted so as to minimise a gap or space between the drive chain element 301 and the respective or corresponding contact element 403 of the drive chain track 401. The profile of the bottom surface 370 is also preferably designed to be capable of contacting a seal member (not shown) projecting upwardly from a lower portion of the respective drive chain track 401 and extending longitudinally therealong. To this end, the profile of the bottom surface 370 acts to minimise the likelihood of fluids, dust or the like that has collected in, for example, a drive rail guttering system 402 migrating between the drive chain 300 and the drive chain track 401 of the side rail 400 and into the cargo bed 110 of the vehicle 100. This is in direct contrast to the curved profiles present on the bottom surface of prior art drive chain elements, which is a known shortcoming thereof.

Figure 6:
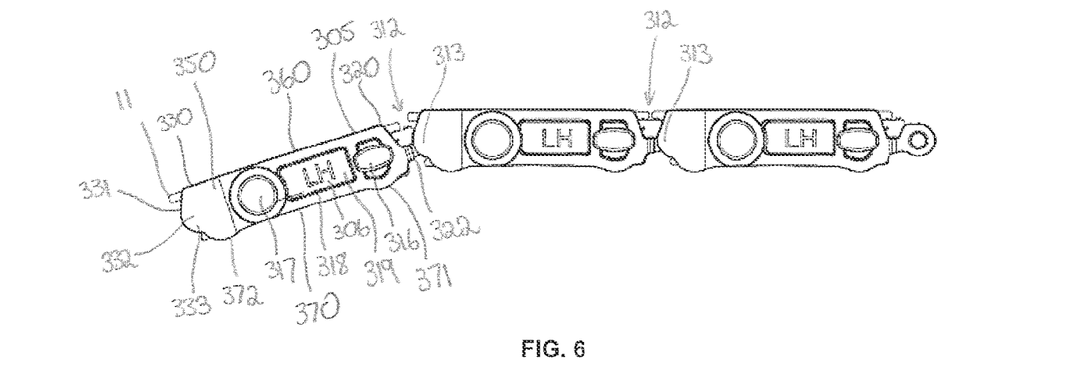
FIG. 6 provides a side view of a number of interconnected drive chain elements of FIG. 3 engaged to an associated slat assembly.
Figure 7:
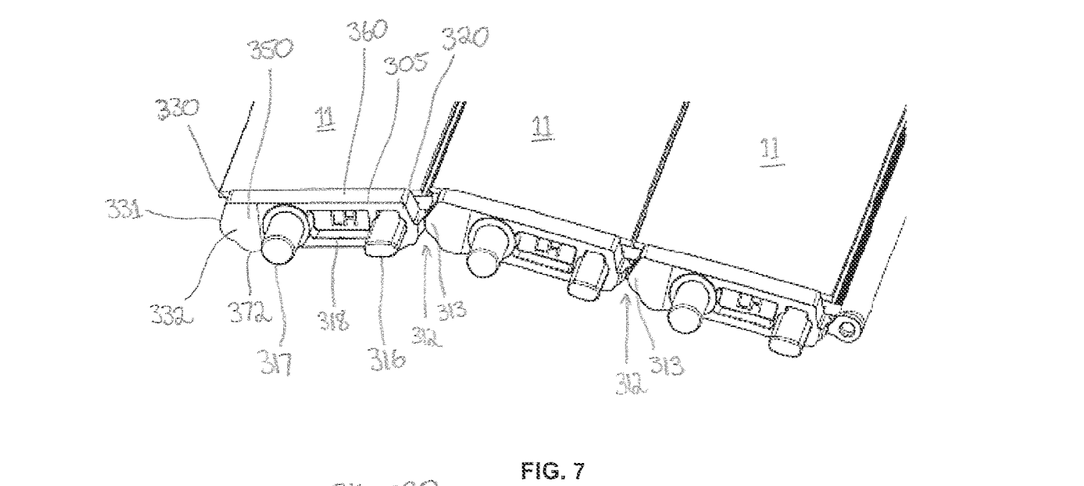
FIG. 7 displays a top-down perspective view of a number of interconnected drive chain elements of FIG. 3 engaged to an associated slat assembly.
Figure 8:
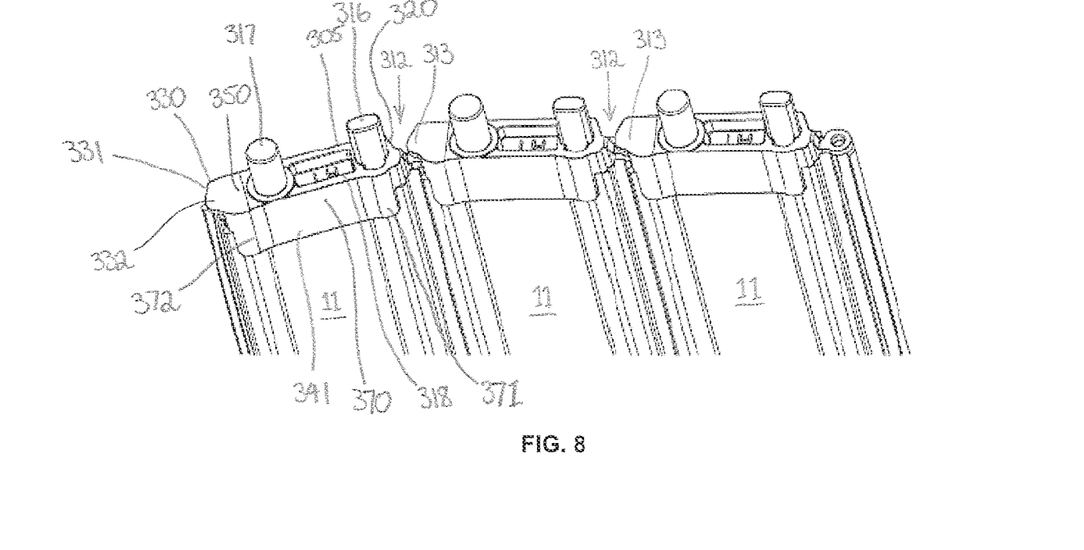
FIG. 8 provides a bottom-up perspective view of a number of interconnected drive chain elements of FIG. 3 engaged to an associated slat assembly.
Figure 9:
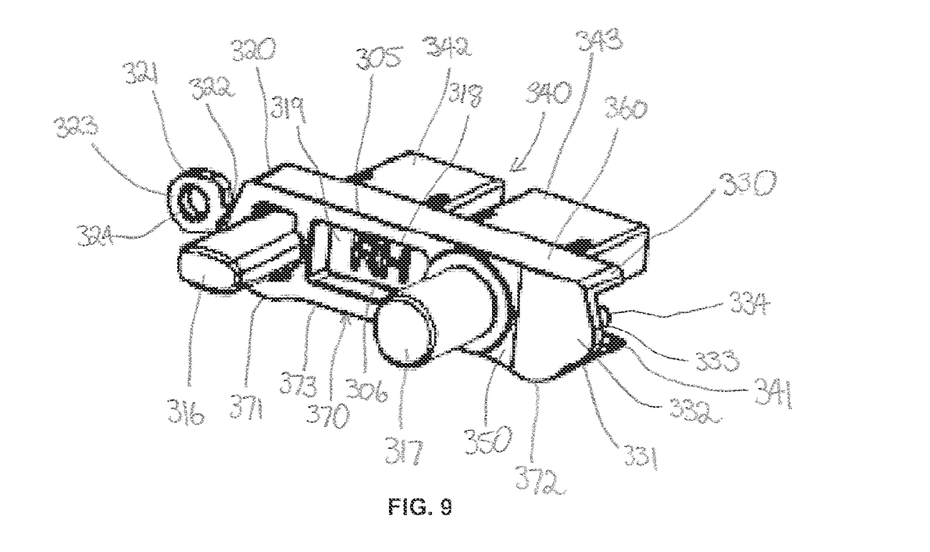
FIG. 9 is a top-down perspective view of another individual drive chain element for use in the drive chain of FIG. 2.

From FIGS. 6 to 8, the respective first and second ends 320,330 of adjacent drive chain elements 301 define a hinge arrangement 312 for operably interconnecting the drive chain elements 301 as well as the adjacent slats 11 to which they are engaged. As illustrated in FIGS. 6 to 8, the hinge arrangement 312 between adjacent drive chain elements 301 of the drive chain 300 defines a pivot point 313 that substantially overlies or corresponds to a further pivot point (not shown), which is defined by a further hinge arrangement (not shown) that operably and pivotably connects adjacent slats 11. In this manner, the drive chain 300 is operable by way of the hinge arrangement 312 to move to the extended position together with the slats 11 of the slat assembly 10 (i.e., to restrict access to the underlying cargo bed 110) in which the plurality of drive chain elements 301 are arranged so as have the respective top surfaces 360 thereof being substantially parallel or defining a co-planar arrangement. In the extended position, the slats 11 are reciprocally or similarly arranged so as have their respective upper surfaces 60 substantially flush theretogether so as to define a substantially flattened or co-planar arrangement.

The drive chain 300 is also operable by way of the hinge arrangement 312 to move to the retracted position (i.e., to allow access to the underlying cargo bed 110) by way of relative pivotal movement between adjacent drive chain elements 301 so as to attain a substantially curved or circular arrangement of the drive chain 300 as well as the associated slat assembly 10, as described in more detail below.

Referring to the hinge arrangement 312, the first end 320 of each drive chain element 301 comprises a first hinge element 321 having an arm portion 322 and a generally circular female mating element 323 extending axially from an edge portion of the inner side 340 of the body 305. In this regard, the female mating element 323 is substantially parallel to, and co-planar with, the arm portion 322 and the inner side 340 of the drive chain element 301. A generally circular aperture or opening 324 is further formed in a central portion of the female mating element 323.

Further to the above, the second end 330 of each drive chain element 301 includes a second hinge element 331 adapted to be pivotably and reciprocally engaged with the first hinge element 321 of the adjacent drive chain element 301. The second hinge element 331 comprises a male mating element 333 having a flattened or planar base portion 332 that extends axially from an edge portion of the outer side 350 of the body 305 so as to be substantially parallel to, and co-planar with at least a portion thereof. A generally frustoconical or cylindrical protrusion or projection 334 is formed in a central portion of the base portion 332 of the male mating element 333 and extends perpendicularly and radially inwards therefrom towards the inner side 340. In this manner, the cylindrical projection 334 of the male mating element 333 is adapted to pivotably and operably engage the female mating element 323 of the adjacent drive chain element 301 when it is coaxially arranged with the corresponding or adjacent circular opening 324 thereof. In this manner, the circular opening 324 is appropriately dimensioned for matingly receiving the cylindrical projection 334 of the corresponding male mating element 333 of the adjacent drive chain element 301 therethrough.

In contrast to the above, one skilled in the art will readily appreciate that the male mating element 333 and the female mating element 323 may be alternatively disposed or positioned at respective first and second ends 320,330 of the drive chain element 301.

During movement of the slat assembly 10 to the extended position, relative upward pivotal movement of the slat 11 translates to relative pivotable movement theretogether in a first direction (e.g., clockwise pivotable movement as shown in FIGS. 6 to 8) of the respective first and second hinge elements 321,331 of adjacent drive chain elements 301 engaged thereto. Conversely, movement of the slat assembly 10 to the retracted position provides for relative downward pivotal movement of the slat 11 in a second direction, which results in relative pivotable movement theretogether (e.g., anti-clockwise pivotable movement as shown in FIGS. 6 to 8) of the respective first and second hinge elements 321,331 of adjacent drive chain elements 301 engaged thereto, as shown in FIGS. 6 to 8.

Advantageously, this arrangement of the male and female mating elements 323,333 allows for the secure engagement of the plurality of drive chain elements 301 theretogether. Further, the male and female mating elements 323,333 being integral with the drive chain element 301 itself provides additional security and strength to the drive chain 300, which in turn acts to reduce or dampen any relative twisting and/or side to side movement of the slats 11 during operation of the roll top cover 1. Such an arrangement thereby advantageously minimises any operational frictional forces associated with the roll top cover 1.

Figure 2:
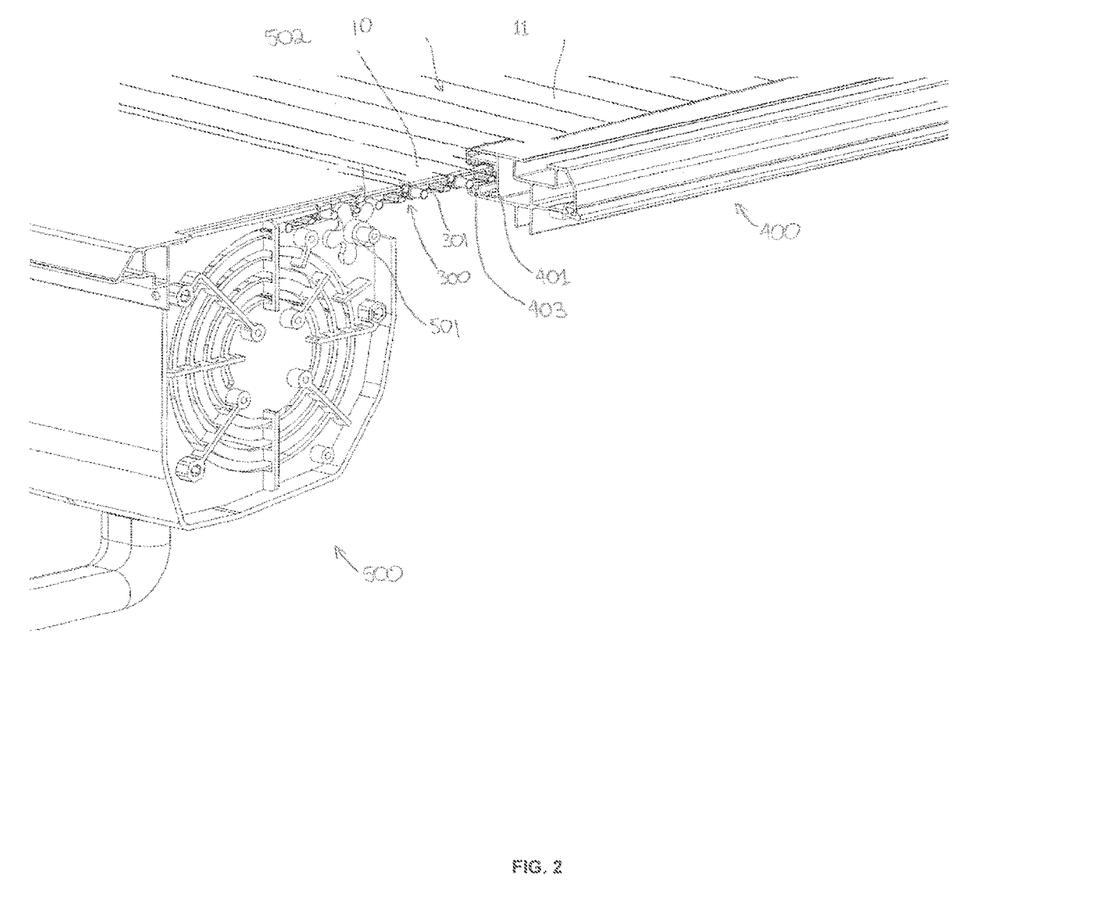
FIG. 2 illustrates a perspective view of a drive chain for use in the roll top cover of FIG. 1 prior to installation on a vehicle.
Figure 3:
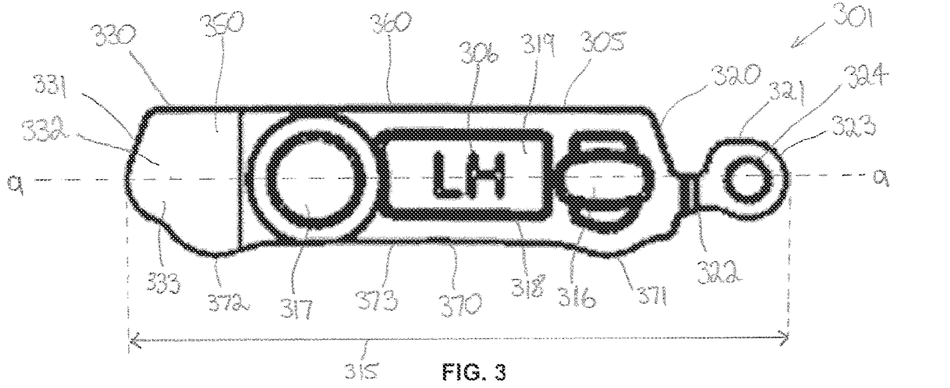
FIG. 3 is a side view of an individual drive chain element for use in the drive chain of FIG. 2.

Each drive chain element 301 further includes first and second drive pins 316,317 for operably receiving therebetween a respective tooth or cog 502 of a rotatable drive sprocket 501 of a drive system 500 during operation of the roll top cover 1, as demonstrated in FIG. 2. With respect to FIGS. 3 to 9, each of the drive pins 316,317 are disposed in spaced relation on the outer side 350 of the body 305 and extend perpendicularly and radially outward therefrom. The first drive pin 316 is curved or rounded rectangular in cross section, whilst the second drive pin 317 is cylindrical in shape having a circular cross section.

The second drive pin 317 functions as a guide pin which guides the drive chain 300 into and around the drive system 500, while the first drive pin 316 drives the drive chain 300. The rounded rectangular profile of the first drive pin 316 enables a reduction in the diameter of the cog 502, therefore enabling a more compact storage of the rolled up slat assembly 10.

Further, having the two drive pins 316, 317 on each drive chain element 301 can provide a more secure and equal pressure at both ends of each drive chain element 301 while in operation. Also, if a drive chain element 301 should ever come loose from a slat 11, the element 301 should nevertheless not jam the drive chain track 401 as the presence of the two pins 316, 371 prevents significant lateral twisting of the element 301 in the track 401. Such an anti-jamming design can be further enabled by a curvature of the distal ends of the pins 316, 317 when viewed from the top or bottom.

Each of the drive pins 316,317 is curved in profile so as to appropriately and smoothly engage or contact the rounded profile of the respective cog 502 during its rotational passage therebetween. In this way, the power transmission or input contact between the cogs 502 and the drive pins 316,317 of the drive chain element 301 is substantially axial in direction for smooth transmission of power to the drive chain 300 from the drive system 500. Additionally, the drive pins 316,317 function to minimise or dampen any side to side movement of the slats 11 during operation of the roll top cover 1, which in turn reduces the operational friction of the drive chain 300 with respect to the drive chain track 401 as the contact surface area therebetween is greatly reduced.

The inner side 340 of the drive chain element 301 is adapted to frictionally and securely engage first and/or second sides (not shown) of the slat 11. To this end, the drive chain element 301 includes a skirt or lip 341 that extends perpendicularly and radially outwards from the inner side 340 of the body 305 such that they are substantially parallel to, and co-planar with, the bottom surface 370 thereof. In this manner, the lip 341 is configured to frictionally engage a lower surface 70 of the associated slat 11.

Figure 4:
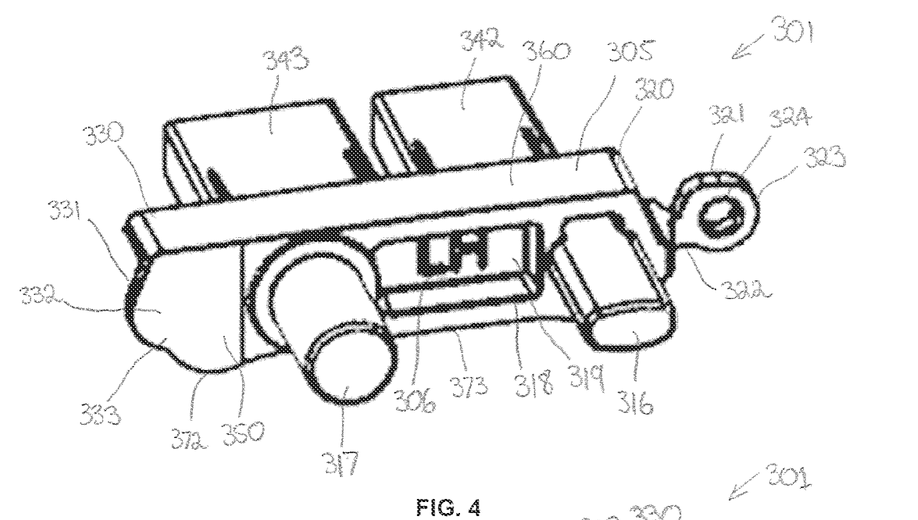
FIG. 4 illustrates a top-down perspective view of an individual drive chain element of FIG. 3.
Figure 5:
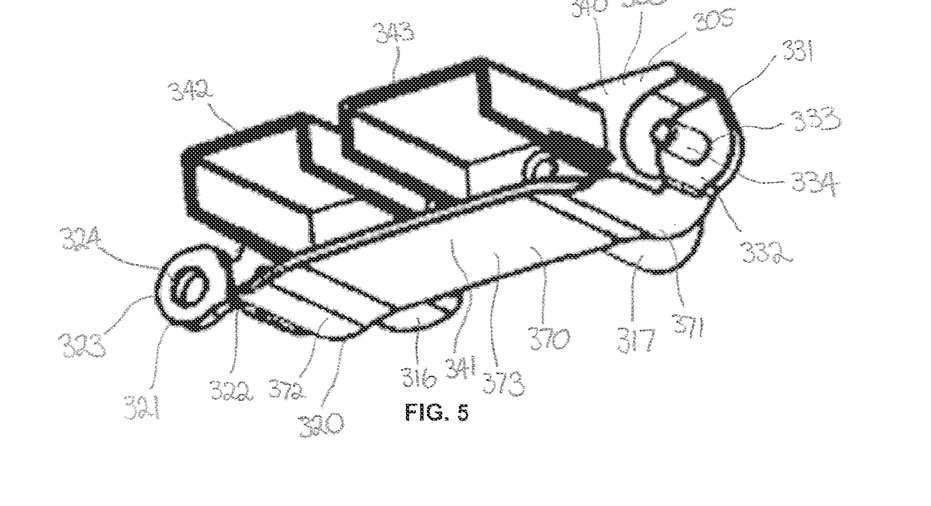
FIG. 5 illustrates a bottom-up perspective view of an individual drive chain element of FIG. 3.

Further to the lip 341, the drive chain element 301 further includes a pair of engagement members 342,343 disposed in a spaced relation along the inner side 340 of the body 305 and extending perpendicularly and radially outwards therefrom. As shown in FIGS. 4 and 5, the engagement members 342,343 define U-shaped open-ended channels of suitable dimensions so as to be received into one or more open spaces (not shown) disposed within the respective sides of their respective slat 11. In this manner, the engagement members 342,343 securely and frictionally engage at least a portion of one or more opposed walls defining the one or more open spaces (not shown) in the sides of the slat 11.

In referring to the Figures, the body 305 further includes a recessed portion 318 disposed substantially centrally therein. The recessed portion 318 is recessed from an outer side 350 of the body 305 and disposed between and adjacent the respective first and second drive pins 316,317. As provided in FIGS. 1 to 5, the recessed portion 318 includes a bottom portion 319 being substantially planar and having an indicator 306 (i.e., LH for left hand side) as to which side of the slat 11 or slat assembly 10 the particular drive chain element 301 is to be applied.

In this regard, each drive chain element 301 is configured to engage either the first or second side (i.e., right hand side or left hand side) of a single slat 11. The drive chain elements 301 for engaging the first side of the slat 11 (see FIGS. 3 to 8, indicated as "LH" or left hand) are in an inverse or mirrored arrangement with respect to those drive chain elements 301 for engaging the second side of the slat 11 (see FIG. 9, indicated as "RH" or right hand, which is labelled with like numbers to the "LH" or left hand example provided in FIGS. 1 to 8 so as to indicate like parts or features thereof). It is envisaged, however, that drive chain elements 301 may be configured to engage both the first and second sides of the slats 11. Further to this, it will be apparent that the drive chain 300 will require as many drive chain elements 301 to operably connect each of the respective first and second sides of their slats 11 to their respective drive chain track 401.

The above description of various features of the disclosure is provided for purposes of description to one of ordinary skill in the related art. It is not intended to be exhaustive or to limit the disclosure to a single disclosed embodiment. As mentioned above, numerous alternatives and variations to the disclosure will be apparent to those skilled in the art of the above teaching. Accordingly, while some alternative features have been discussed specifically, other features will be apparent or relatively easily developed by those of ordinary skill in the art. The disclosure is intended to embrace all alternatives, modifications, and variations of the features that have been discussed herein, and other features that fall within the spirit and scope of the above described disclosure.

The invention claimed is:

1. A drive chain element for operably connecting a slat of a roll top cover to a drive rail comprising:
   an elongate body that defines a longitudinal axis and first and second ends, an inner side of the elongate body configured for engaging an end portion of the slat;
   first and second hinge elements disposed at the respective first and second ends of the body, the first and second hinge elements configured to define a hinge arrangement between adjacent drive chain elements that facilitates relative pivotal movement therebetween; and
   first and second pins disposed in a spaced arrangement along an outer side of the body and extending outwardly therefrom;
   wherein the first and second pins are configured for operably contacting a drive system during operation of the roll top cover; and
   wherein the first pin is rounded rectangular in cross section to reduce a size of the drive system.

2. The drive chain element of claim 1, wherein the first and second hinge elements are integral with the body.

3. The drive chain element of claim 1, wherein the second pin is cylindrical in shape.

4. The drive chain element of claim 1, wherein a lower surface of the body comprises first and second curved projections in a spaced arrangement therealong and extending outwardly therefrom, the first and second curved projections for slidably supporting the drive chain element within the drive rail.

5. The drive chain element of claim 4, wherein the lower surface comprises a flattened portion disposed between the first and second curved projections.

6. The drive chain element of claim 1, wherein one of the first and second hinge elements comprises a male mating element and one of the first and second hinge elements comprises a female mating element for operably receiving the male mating element.

7. The drive chain element of claim 1, wherein the hinge arrangement between adjacent drive chain elements defines a pivot point that substantially overlies a further pivot defined by respective adjacent slats.

8. A drive chain assembly for operably connecting a slat assembly of a roll top cover to a drive rail, the drive chain assembly comprising:
   a plurality of operably connected drive chain elements;
   each drive chain elements including:
      an elongate body that defines a longitudinal axis and first and second ends, an inner side of the elongate body configured for engaging an end portion of the slat,
      first and second hinge elements disposed at the respective first and second ends of the body, the first and second hinge elements configured to define a hinge arrangement between adjacent drive chain elements that facilitates relative pivotal movement therebetween, and
      first and second pins disposed in a spaced arrangement along an outer side of the body and extending outwardly therefrom;
   wherein the first and second pins are configured for operably contacting a drive system during operation of the roll top cover; and
   wherein the first pin is rounded rectangular in cross section to reduce a size of the drive system.

9. The drive chain assembly of claim 8, wherein the first and second hinge elements are integral with the body.

10. The drive chain assembly of claim 8, wherein the second pin is cylindrical in shape.

11. The drive chain assembly of claim 8, wherein a lower surface of the body comprises first and second curved projections in a spaced arrangement therealong and extending outwardly therefrom, the first and second curved projections for slidably supporting the drive chain element within the drive rail.

12. The drive chain assembly of claim 11, wherein the lower surface comprises a flattened portion disposed between the first and second curved projections.

13. The drive chain assembly of claim 8, wherein one of the first and second hinge elements comprises a male mating element and one of the first and second hinge elements comprises a female mating element for operably receiving the male mating element.

14. The drive chain assembly of claim 8, wherein the hinge arrangement between adjacent drive chain elements defines a pivot point that substantially overlies a further pivot defined by respective adjacent slats.

15. A roll top cover assembly, comprising:
   a drive system including a track and a cog;
   a drive chain including a plurality of operably connected drive chain elements, each of the drive chain elements including:
      an elongate body that defines a longitudinal axis and first and second ends, an inner side of the elongate body configured for engaging an end portion of the slat,
      first and second hinge elements disposed at the respective first and second ends of the body, the first and second hinge elements configured to define a hinge arrangement between adjacent drive chain elements that facilitates relative pivotal movement therebetween, and
      a first pin and a second pin disposed in a spaced arrangement along an outer side of the body and extending outwardly therefrom, the first pin driving and not guiding the drive chain and the second pin guiding the drive chain around the drive system.

16. The roll top cover assembly of claim 15, wherein the first pin is rounded rectangular in cross section to reduce a diameter of the cog and the second pin is circular in cross section.

17. The roll top cover assembly of claim 16, wherein the first pin is curved in profile and contacts a rounded profile of the cog.

18. The roll top cover assembly of claim 15, wherein each of the plurality of operably connected drive chain elements includes a lower surface having first and second curved projections in a spaced arrangement therealong and extending outwardly therefrom, the first and second curved projections in contact with the track.

19. The roll top cover assembly of claim 18, wherein the lower surface comprises a flattened portion disposed between the first and second curved projections.

* * * * *